United States Patent
Hsiao et al.

(10) Patent No.: US 9,321,225 B2
(45) Date of Patent: Apr. 26, 2016

(54) OPTICAL PLATE WITH MICROSTRUCTURES

(71) Applicant: CHI MEI CORPORATION, Tainan (TW)

(72) Inventors: Hsiu-Fang Hsiao, Kaohsiung (TW); Chueh-Yang Tsai, Kaohsiung (TW); Chun-Liang Kuo, Tainan (TW); Hsin-Hung Chen, Tainan (TW); Chung-Ping Huang, Lienchiang County (TW)

(73) Assignee: CHI MEI CORPORATION, Tainan (TW)

( * ) Notice: Subject to any disclaimer, the term of this patent is extended or adjusted under 35 U.S.C. 154(b) by 268 days.

(21) Appl. No.: 14/140,095

(22) Filed: Dec. 24, 2013

(65) Prior Publication Data

US 2014/0185304 A1 Jul. 3, 2014

(30) Foreign Application Priority Data

Dec. 28, 2012 (TW) .............................. 101151171 A

(51) Int. Cl.
*F21V 8/00* (2006.01)
*B29D 11/00* (2006.01)

(52) U.S. Cl.
CPC ...... *B29D 11/0073* (2013.01); *B29D 11/00288* (2013.01); *G02B 6/0038* (2013.01); *G02B 6/0065* (2013.01)

(58) Field of Classification Search
CPC .................... B29D 11/0073; B29D 11/00288; G02B 6/0038
See application file for complete search history.

(56) References Cited

U.S. PATENT DOCUMENTS

2014/0321163 A1* 10/2014 Kao .................... G02B 6/0038
362/619

FOREIGN PATENT DOCUMENTS

| CN | 101424754 A | | 5/2009 |
| TW | 200938889 A | | 9/2009 |
| TW | 201015128 A | * | 4/2010 |
| TW | 201017241 A | | 5/2010 |
| TW | 201022785 A | | 6/2010 |
| TW | 201124760 A1 | | 7/2011 |

OTHER PUBLICATIONS

Search Report issued in Taiwanese Application No. 101151171 dated Aug. 15, 2014.
Chinese Search Report dated mailed Nov. 9, 2015 issued in corresponding Chinese Application No. 2013101857671.

* cited by examiner

*Primary Examiner* — David V Bruce
(74) *Attorney, Agent, or Firm* — Nath, Goldberg & Meyer; Jerald L. Meyer

(57) ABSTRACT

An optical plate includes a substrate having a light emitting surface, a rear surface opposite to the light emitting surface, and a plurality of microstructures that cooperatively define the light emitting surface and each of which parallelly extends in a light traveling direction. Each of the microstructures includes first and second convex portions and a concave portion disposed between and interconnecting the first and second convex portions, and two adjacent ones of the microstructures are connected. Intersections between the microstructures cooperatively define an imaginary plane, and a lowest point of the concave portion is disposed at one side of the imaginary plane opposite to the rear surface of the substrate.

18 Claims, 5 Drawing Sheets

OPTICAL PLATE WITH MICROSTRUCTURES

CROSS-REFERENCE TO RELATED APPLICATION

This application claims priority of Taiwanese Application No. 101151171, filed on Dec. 28, 2012.

BACKGROUND OF THE INVENTION

1. Field of the Invention

This invention relates to an optical plate, more particularly to an optical plate with microstructures.

2. Description of the Related Art

An optical plate is mainly used to change and guide a traveling direction of light. As shown in FIG. 1, a conventional optical plate 1 includes a substrate 10 and a plurality of microstructures 12 that are formed on the substrate 10 and that define a light emitting surface 11.

The microstructures 12 are parallelly adjacent to each other, and each of the microstructures 12 includes a convex portion 121 that has a cross-sectional area decreased gradually in a direction away from the substrate 10. The convex portion 121 of each of the microstructures 12 has a triangle shape or a sector shape in cross section.

The optical plate 1 is a light guiding medium in a backlight module (not shown). When the optical plate 1 is used in an edge type backlight module of a LCD device, the same can guide the direction of the light, and improve light uniformity of the LCD device. In the backlight module, a light source (such as a plurality of LEDs) is disposed at one side of the substrate 10. Light emitted from the light source enters into the optical plate 1, is reflected continuously in the optical plate 1, and is then refracted by the microstructures 12 for emitting the light outwardly. Since a plurality of LEDs are used as the light source and emit light into the optical plate 1 from one side of the substrate 10, areas between adjacent LEDs would have lower light intensity, thereby resulting in a hotspot problem.

Since the optical plate 1 is used to guide the light to emit outwardly and smoothly and is a main controlling factor for light uniformity, a pattern of the microstructures 12 would influence the light uniformity.

SUMMARY OF THE INVENTION

The object of the present invention is to provide an optical plate which includes particular microstructures that can guide light and effectively improve light uniformity.

According to the present invention, an optical plate is provided, which includes a substrate having a light emitting surface, a rear surface opposite to the light emitting surface, and a plurality of microstructures that cooperatively define the light emitting surface and each of which parallelly extends in a light traveling direction. Each of the microstructures includes first and second convex portions and a concave portion disposed between and interconnected the first and second convex portions.

Two adjacent ones of the microstructures are connected. Intersections between the microstructures cooperatively define an imaginary plane, and a lowest point of the concave portion is disposed at one side of the imaginary plane opposite to the rear surface.

According to another embodiment of present invention, each of microstructures has a width (P) defined by a distance between two adjacent intersections, each of microstructures having a maximum height (H) defined between one of the first and second convex portions and the imaginary plane, the maximum height (H) is in a range between 10 μm and 25 μm, and the ratio of H to P (H/P) of each of said microstructures is in a range between 0.1 and 0.5.

According to another embodiment of present invention, the maximum height (H) of each of microstructure is in a range between 13 μm and 24 μm, and the ratio of H to P (H/P) of each of microstructures is in a range between 0.2 and 0.4.

According to one embodiment of present invention, the concave portion of each of microstructures has a minimum distance ($D_3$) defined between the lowest point of the concave portion and the imaginary plane, and the minimum distance ($D_3$) is in a range of higher than 16 μm and lower than 24 μm.

According to another embodiment of present invention, the minimum distance ($D_3$) of each of microstructures is in a range of higher than 18 μm and lower than 22 μm.

According to another embodiment of present invention, in each of microstructures, first convex portion has a first tip and second convex portion has a second tip, and a distance (L) between first and second tips of each of microstructures is in a range of larger than 1.0 μm and lower than 40 μm.

According to another embodiment of present invention, the distance (L) between first and second tips of each of microstructures is in a range of larger than 3.0 μm and lower than 35 μm.

According to one embodiment of present invention, substrate of the optical plate further includes a supporting layer and a conforming layer formed on supporting layer, microstructures being formed on conforming layer opposite to supporting layer.

According to another embodiment of present invention, conforming layer of the substrate has a thickness in a range from 50 μm to 200 μm, and supporting layer has a thickness in a range from 0.45 mm to 5 mm.

According to another embodiment of present invention, substrate of the optical plate has a thickness in a range from 0.51 mm to 5.225 mm.

According to another embodiment of present invention, the conforming layer is made of a first resin material and the supporting layer is made of a second resin material.

According to another embodiment of present invention, the first resin material having a first molecular weight, the second resin material having a second molecular weight and the first molecular weight is lower than the second molecular weight.

According to one embodiment of present invention, each of first and second convex portions of each of microstructures has at least one arc surface.

According to one embodiment of present invention, each of first and second convex portions of each of microstructures has an arc surface adjacent to an adjacent one of said microstructures.

According to a method for manufacturing an optical plate of present invention, a first resin material and a second resin material are provided, a co-extrusion step is conducted to co-extrude the first resin material and the second resin material to form a two-layered structure; and a microstructure forming step is conducted to form the first resin material into a conforming layer and microstructures, and to form the second resin material into a supporting layer on which the conforming layer and microstructures are disposed.

According to one embodiment of present invention, the first resin material having a first molecular weight, the second resin material having a second molecular weight and the first molecular weight is lower than the second molecular weight.

According to one embodiment of present invention, the microstructures are formed by a transfer roller.

According to one embodiment of present invention, the transfer roller has a transfer structure on a roller surface.

According to one embodiment of present invention, the transfer structure has a pattern complementary to that of the microstructures.

DETAILED DESCRIPTION OF THE EMBODIMENTS

Figure 2:
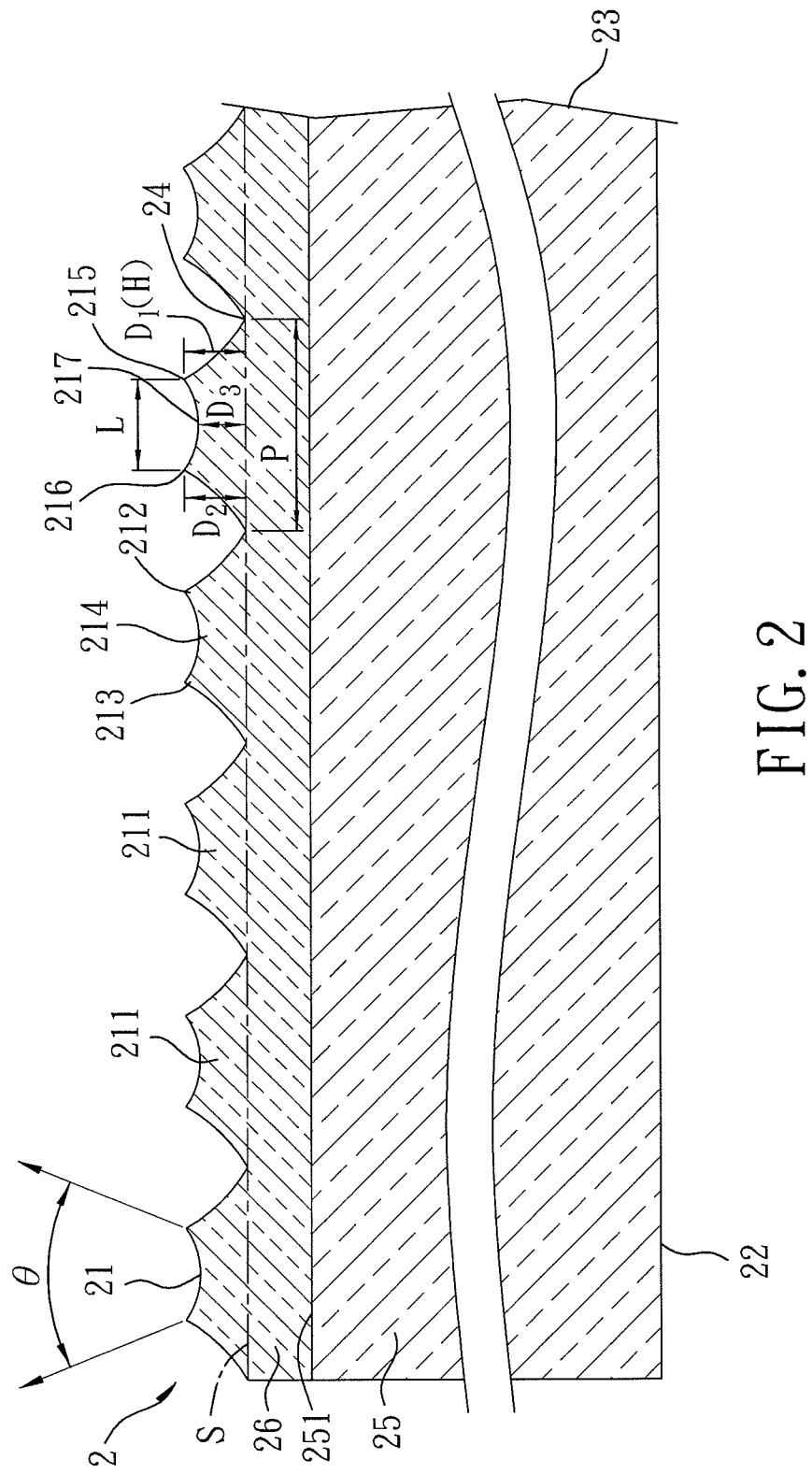
FIG. 2 is a sectional view of an optical plate with microstructures according to a first embodiment of the present invention.
Figure 3:
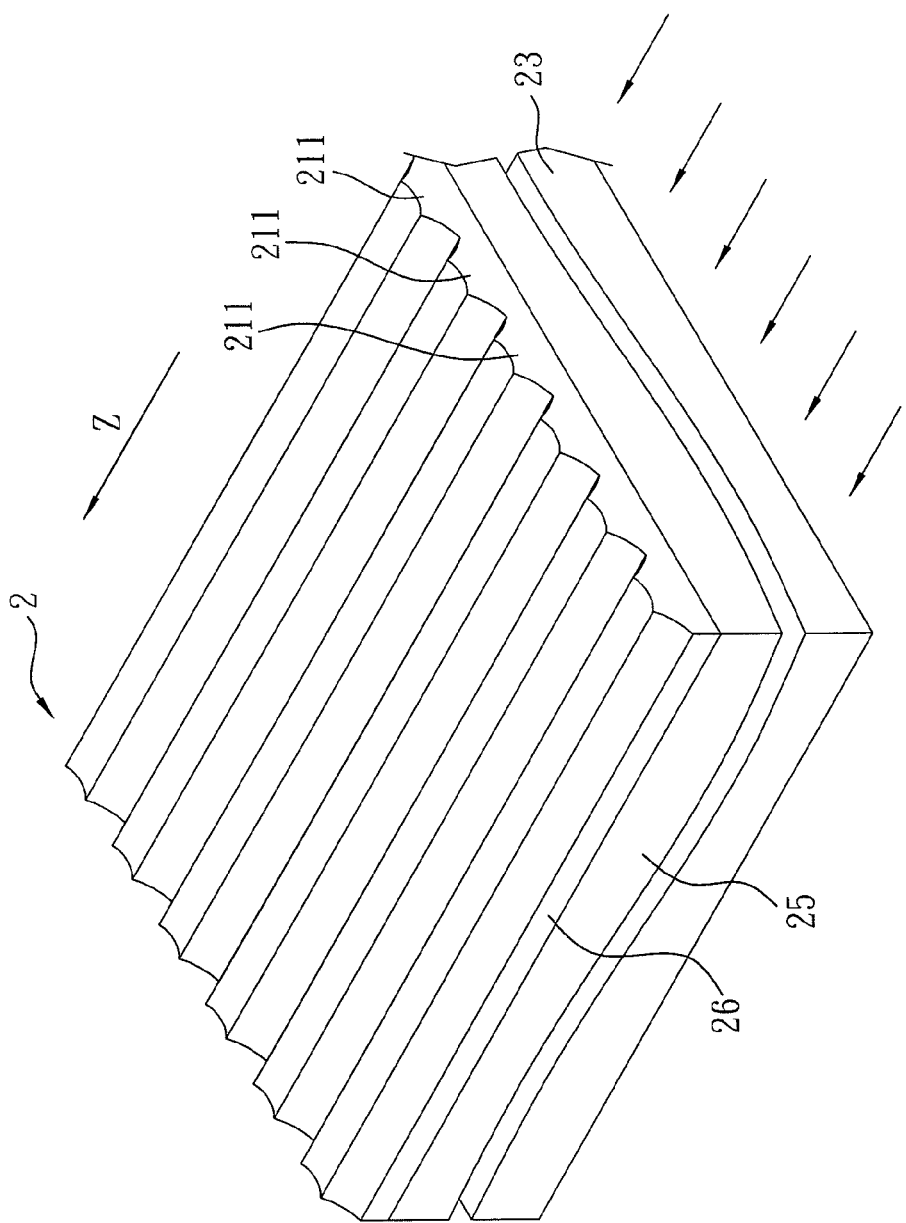
FIG. 3 is a perspective view of the first embodiment.

Hereinafter, the present invention will be described in detail by explaining embodiments of the invention with reference to the attached drawings. The same reference numerals in the drawings denote the same element. In the drawings, the thicknesses of layers and regions are exaggerated for clarity. Referring to FIGS. 2 and 3, an optical plate according to the first embodiment of present invention is illustrated. In this embodiment, the optical plate comprises a substrate 2.

The substrate 2 has a light emitting surface 21, a rear surface 22 opposite to the light emitting surface 21, and a lateral surface 23 that interconnects the light emitting surface 21 and the rear surface 22. The substrate 2 includes a plurality of microstructures 211 that cooperatively define the light emitting surface 21 and each of which parallelly extends in a light traveling direction (Z) of the substrate 2 (see FIG. 3).

Each of the microstructures 211 includes first and second convex portions 212, 213 and a concave portion 214 disposed between and interconnecting the first and second convex portions 212, 213. Two adjacent ones of the microstructures 211 are connected, intersections 24 between the microstructures 211 cooperatively define an imaginary plane (S), and a lowest point 217 of the concave portion 214 is disposed at one side of the imaginary plane (S) opposite to the rear surface 22, i.e., the lowest point 217 is disposed at a position higher than the imaginary plane (S).

Each of the first and second convex portions 212, 213 of each of the microstructures 211 has a cross sectional area in a direction perpendicular to the light traveling direction. The cross sectional area is decreased gradually in the direction away from the imaginary plane (S). In other word, each of the microstructures 211 has a cross sectional shape similar to a volcano with an indentation at top.

Each of the first and second convex portions 212, 213 of each of the microstructures 211 has at least one arc surface. Preferably, each of the first and second convex portions 212, 213 of each of the microstructures 211 has the arc surface adjacent to an adjacent one of the microstructures 211.

Additionally, each of the microstructures 211 has a width (P) defined by a distance between two adjacent intersections 24. In each of the microstructures 211, the first convex portion 212 has a first tip 215, and the second convex portion 213 has a second tip 216. The distance between the first tip 215 and the imaginary plane (S) is $D_1$, and the distance between the second tip 216 and the imaginary plane (S) is $D_2$. The largest one of $D_1$ and $D_2$ is referred to as a maximum height (H) of a corresponding one of the microstructures 211 from the imaginary plane (S). In FIG. 2, $D_1$ is H. The maximum height (H) ranges from 10 μm to 25 μm and a ratio of H to P (H/P) of each of the microstructures 211 ranges from 0.1 to 0.5.

Referring to FIG. 3, light is emitted to the lateral surface 23 of the substrate 2, light would be reflected continuously between the light emitting surface 21 and the rear surface 22 of the substrate 2 and travels in a light traveling direction (Z), and then emitted outwardly through the light emitting surface 21 by virtue of refraction of the microstructures 211.

Figure 1:
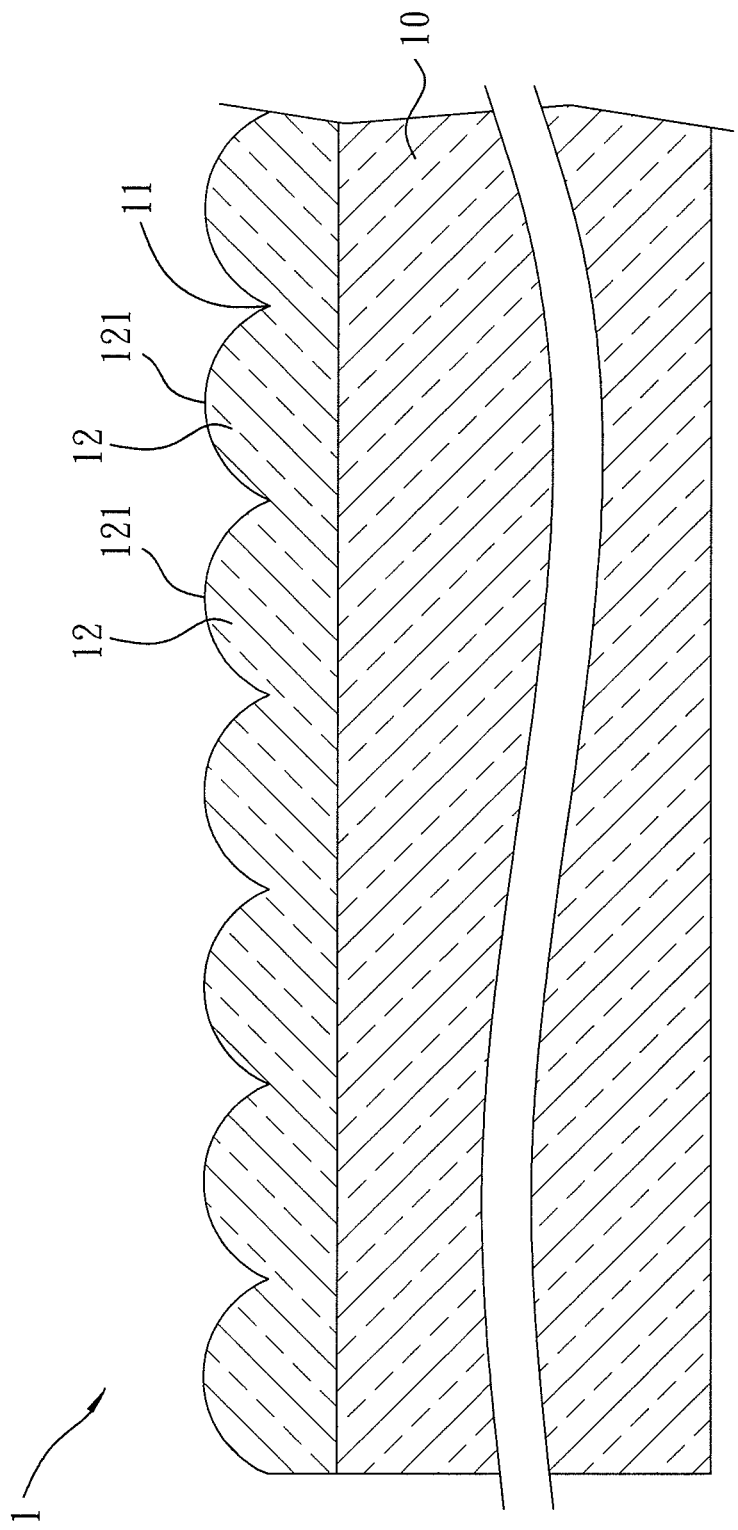
FIG. 1 is a sectional view of a conventional optical plate.

In this embodiment, the first and second convex portions 212, 213 and the concave portion 214 of each of the microstructures 211 could be used as refracting surfaces so that the light would be refracted at a wider angle as compared to the conventional optical plate shown in FIG. 1. Hence, a light-exiting angle may be increased and light extraction efficiency may be improved.

To be specific, in this embodiment, the aforementioned light-exiting angle is referred to as an angle (θ) between the left-most light ray and the right-most light ray emitted outwardly from each of the microstructures 211.

The increased light-exiting angle would improve a light-mixing degree between the adjacent microstructures 211 and light uniformity of the optical plate according to the present invention.

Moreover, due to the improved light extraction efficiency, the hotspot problem can be alleviated.

In one embodiment, a superior light-exiting angle is provided when a maximum height (H) of each of the microstructure 211 ranges from 13 μm to 24 μm and the ratio of H to P (H/P) of each of the microstructures 211 ranges from 0.2 to 0.4. When the maximum height (H) and the ratio of H/P of each of the microstructures 211 are in the aforementioned ranges, the hotspot problem may be alleviated.

In one embodiment, the concave portion 214 of each of the microstructures 211 has a minimum distance ($D_3$) from the imaginary plane (S). The minimum distance ($D_3$) is higher than 16 μm and lower than 24 μm so as to obtain a superior light-exiting angle. In another embodiment, the minimum distance ($D_3$) of each of the microstructures 211 is better within a range of higher than 18 μm and lower than 22 μm.

In one embodiment, a distance (L) between the first and second tips 215, 216 of each of the microstructures 211 is larger than 1.0 μm and lower than 40 mm so as to obtain a superior light-exiting angle. In another embodiment, the distance (L) of each of the microstructures 211 is better within a range of larger than 3.0 μm and lower than 35 μm.

In one embodiment, the substrate 2 further includes a supporting layer 25 and a conforming layer 26 formed on an upper surface 251 of the supporting layer 25, and the microstructures 211 are formed on the conforming layer 26 opposite to the supporting layer 25 so as to form a laminate. Thus, the order of the components in the laminate from the light emitting surface 21 to the rear surface 22 is the microstructures 211, the conforming layer 26, and the supporting layer 25.

In this embodiment, the microstructures 211, the conforming layer 26, and the supporting layer 25 cooperatively form the substrate 2. The conforming layer 26 has a thickness in a range from 50 μm to 200 μm, the supporting layer 25 has a thickness in a range from 0.45 mm to 5 mm, and thus the substrate 2 has a thickness in a range from 0.51 mm to 5.225 mm. In this embodiment, the thickness of the conforming layer 26 refers to a perpendicular distance from the imaginary plane (S) to the upper surface 251 of the supporting layer 25. The thickness of the supporting layer 25 refers to a perpendicular distance from the upper surface 251 to the rear surface 22 of the substrate 2. The thickness of the substrate 2 refers to a perpendicular distance from the highest one of the first and second tips 215, 216 to the rear surface 22 of the substrate 2.

In one embodiment, the conforming layer 26 is made of a first resin material and the supporting layer 25 is made of a second resin material. The microstructures 211 can be integrally formed on a surface of the conforming layer 26, i.e., both of the microstructures 211 and the conforming layer 26 are made of first resin material and formed integrally as one piece.

In one embodiment, the first resin material is a thermoplastic resin, such as, a transparent thermoplastic resin. Examples of the first resin material include (meth)acrylic acid ester resin, polystyrene resin, polycarbonate resin, methyl methacrylate-styrene copolymer, acrylonitrile-styrene copolymer, polyethylene terephthalate, and combinations thereof.

In one embodiment, the second resin material is a thermoplastic resin, such as, a transparent thermoplastic resin. Examples of the second resin material include (meth)acrylic acid ester resin, polystyrene resin, polycarbonate resin, methyl methacrylate-styrene copolymer, acrylonitrile-styrene copolymer, polyethylene terephthalate, and combinations thereof.

In another embodiment, the (meth)acrylic acid ester resin may be a acrylic acid ester resin or a methyl acrylic acid ester resin, such as, a polymer composed of (meth)acrylic acid ester monomer (for example, polymethyl methacrylate, PMMA). The (meth)acrylic acid ester monomer is referred to as acrylic acid ester monomer or (meth)acrylic acid ester monomer. Examples of the (meth)acrylic acid ester monomer include, but are not limited to, methyl methacrylate monomer, ethyl methacrylate monomer, isopropyl methacrylate monomer, n-butyl acrylate monomer, methyl acrylate monomer, ethyl acrylate monomer, and isopropyl acrylate monomer. In one embodiment, the (meth)acrylic acid ester monomer is methyl methacrylate monomer or methyl acrylate monomer.

Compositions of the first and second resin materials may be the same or different. In one embodiment, the compositions of the first and second resin materials are same material with different molecular weight, such as, (meth)acrylic acid ester resin. In one embodiment, a chain length of the resin material is controlled by molecular weight so as to control a softening point of the first and second resin material.

The optical plate with the microstructures 211 of the present invention may be made through various manufacturing methods.

Figure 4:
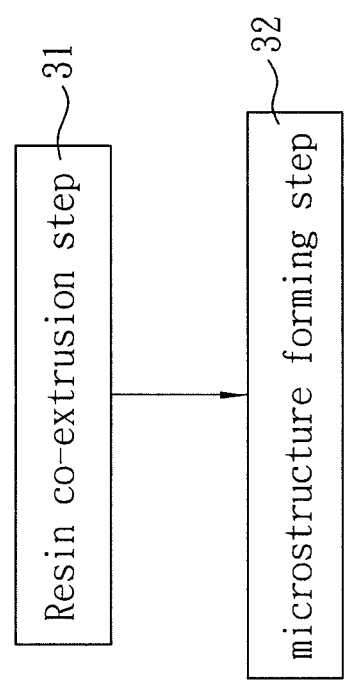
FIG. 4 is a flow chart illustrating a method for making the optical plate with microstructures of the first embodiment.

Referring to FIG. 4, a method for manufacturing the optical plate with the microstructures 211 of present invention is illustrated. In this embodiment, the manufacturing method includes a resin co-extrusion step 31 and a microstructure forming step 32.

Firstly, the resin co-extrusion step 31 is conducted. In this embodiment, polystyrene resin is used as the first resin material, and polystyrene resin having a different molecular weight from the first resin material is used as the second resin material. The first and second resin materials are respectively extruded under heat and pressure conditions, and then the extruded first and second resin materials are co-extruded through a die of an extruder so as to form a two-layered structure. In this embodiment, the two-layered structure is made by two polystyrene resin having different molecular weight. In one embodiment, molecular weight of the first resin material is lower than molecular weight of the second resin material.

Secondly, the microstructure forming step 32 is conducted by directing the two-layered structure through a forming machine so as to form the optical plate with the microstructures 211 according to this invention. For forming the optical plate of the present invention, the forming machine is composed of a transfer roller and two back pressure rollers. A transfer structure that can be used to form the microstructures 211 is formed on a roller surface of the transfer roller, i.e., the transfer structure has a pattern complementary to that of the microstructures 211. In one embodiment, the transfer roller and the back pressure rollers are aligned, and the transfer roller may be disposed at one side of the pair of the back pressure rollers or be disposed between the two back pressure rollers.

In one embodiment, the transfer structure of the transfer roller is a grooved structure, and each of the microstructures 211 of the optical plate has a protrusion structure. In this embodiment, the two-layered structure passes through a nip between the transfer roller and one of the back pressure rollers, the two-layered structure is pressed by the transfer roller and said one of the back pressure rollers so that the first resin material is pressed and fills into the transfer structure of the transfer roller. Therefore, the first resin material is formed into the conforming layer 26 and the microstructures 211 that have a pattern complementary to that of the transfer structure, and the second resin material is formed into the supporting layer 25 so as to obtain the optical plate with the microstructures 211 of the present invention.

Referring to Table 1, experimental results of Examples and a Comparative Example are listed. The light-exiting angle (θ) in Table 1 shows a simulation result and was obtained by using GTOOLS software to simulate light emitted behavior.

TABLE 1

| | Example 1 | Example 2 | Example 3 | Comparative Example |
|---|---|---|---|---|
| Each of the microstructures | First convex portion/ concave portion/ second convex portion | First convex portion/ concave portion/ second convex portion | First convex portion/ concave portion/ second convex portion | A dome-shaped convex portion as shown in FIG. 1 |
| $D_1$ (μm) | 19.45 | 18.1 | 22.2 | — |
| $D_2$ (μm) | 19.43 | 18 | 22 | — |
| H (μm) | 19.45 | 18.1 | 22.2 | 23.1 |
| P (μm) | 70.37 | 61.8 | 60.4 | 63 |
| H/P | 0.276 | 0.293 | 0.368 | 0.406 |
| $D_3$ (μm) | 17.59 | 17.4 | 21.2 | — |
| L (μm) | 30.1 | 4.6 | 8.0 | — |
| Conforming layer thickness (μm) | 150 | 148 | 153 | — |
| Supporting layer thickness (mm) | 2.85 | 2.852 | 2.847 | — |
| Substrate thickness (mm) | 3.02 | 3.02 | 3.02 | 3.02 |
| Light-exiting angle | 25° | 46° | 41° | 18° |
| Light-mixing degree | Good | Good | Good | Poor |

In Table 1, Comparative Example uses a conventional optical plate with microstructures as shown in FIG. 1, in which each of the parallelly extending microstructures included a sector convex portion 12.

Examples 1-3 use the optical plates with microstructures of present invention, in which each of the parallelly extending microstructures included the spaced apart first and second convex portions 212, 213, and the concave portion 214 disposed between and interconnected the first and second convex portions 212, 213.

The optical plates of Examples 1-3 were manufactured by the aforesaid method described in FIG. 4.

Referring to Table 1, in Examples 1-3, each of the microstructures had the particular structural design in combination with particular maximum height (H), width (P) and H/P ratio. The simulation results reveal that the light-exiting angle in Examples 1-3 is larger than that of Comparative Example so as to provide better light-mixing degree. In contrast, the light-exiting angle in Comparative Example is small, and thus the light-mixing degree is poor.

Figure 5:
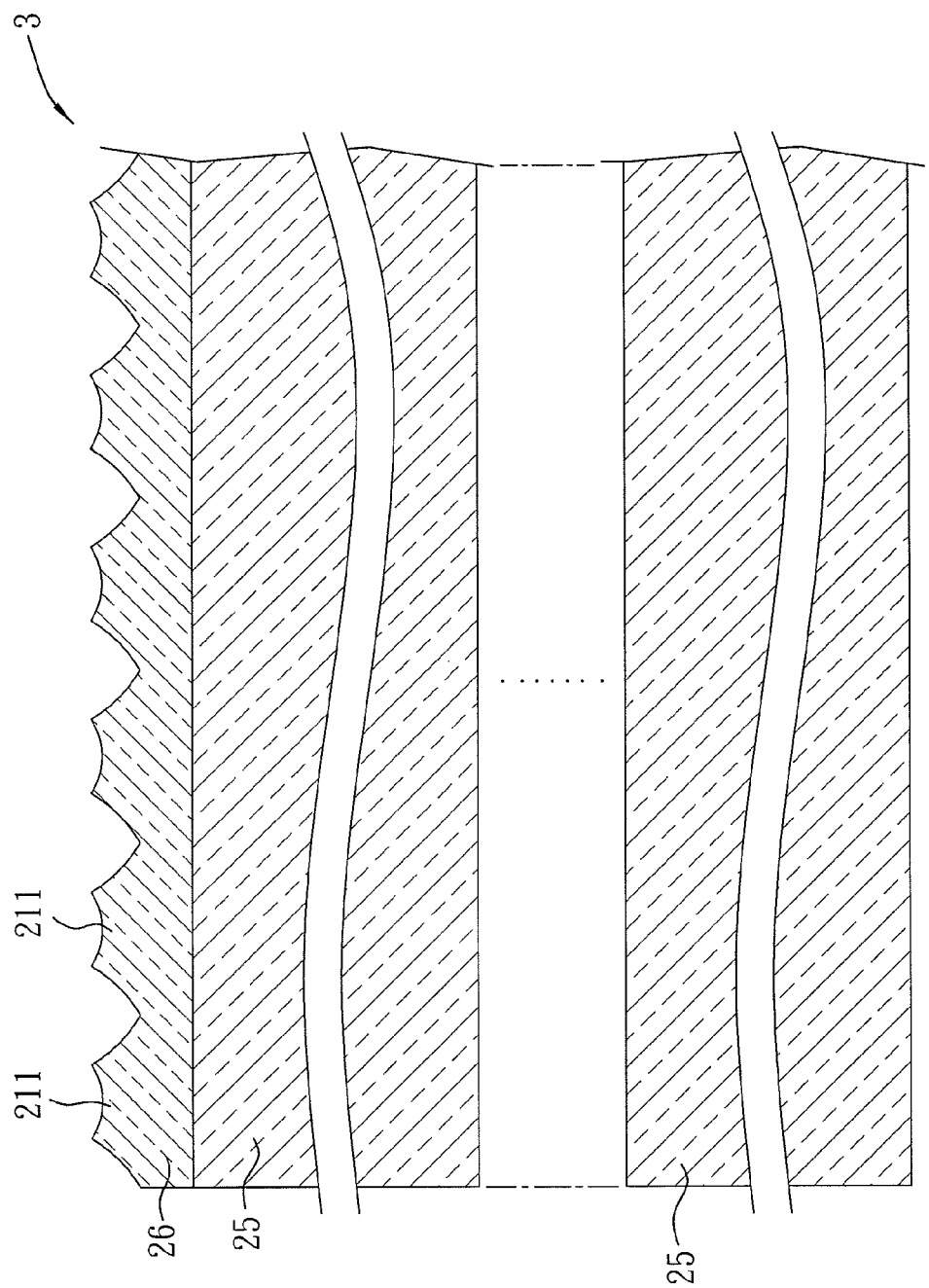
FIG. 5 is a sectional view of the optical plate with microstructures according to a second embodiment of the present invention.

Referring to FIG. 5, the optical plate with microstructures according to second embodiment of present invention is illustrated. In this embodiment, a structure of the optical plate with microstructures is similar to the structure of above-mentioned embodiments, the difference is that the substrate 3 in this embodiment has a plurality of superposed supporting layers 25, and the conforming layer 26 is formed on the upper surface 251 of the topmost one of the supporting layers 25.

In this embodiment, the topmost one of the supporting layers 25 is made of the second resin material, and the conforming layer 26 is made of the first resin material.

The method for manufacturing the substrate 3 is similar to that for substrate 2 as the above-mention description, except that: in the resin extrusion step 31, a first resin material and a plurality of second resin material were extruded, respectively. Afterward, the extruded first and second resin materials were co-extruded via the die of the extruder to form a superposed multi-layered structure that includes a plurality of supporting layers 25.

From the foregoing description, with the structural design of the microstructures 211, such as, having the first and second convex portions 212, 213, and the concave portion 214 disposed between and interconnected the first and second convex portions 212, 213, the light-exiting angle can be enhanced, thereby improving the light-mixing degree of the optical plate.

While the present invention has been described in connection with what are considered the most practical and embodiments, it is understood that this invention is not limited to the disclosed embodiments but is intended to cover various arrangements included within the spirit and scope of the broadest interpretation and equivalent arrangements.

What is claimed is:

1. An optical plate, comprising:
    a substrate having a light emitting surface, a rear surface opposite to said light emitting surface, and a plurality of microstructures that cooperatively define said light emitting surface and each of which parallelly extends in a light traveling direction,
    wherein each of said microstructures includes first and second convex portions and a concave portion disposed between and interconnecting said first and second convex portions, two adjacent ones of said microstructures being connected, intersections between said microstructures cooperatively define an imaginary plane (S), a lowest point of said concave portion being disposed at one side of the imaginary plane opposite to said rear surface,
    wherein each of said first and second convex portions of each of said microstructures has a concave arc surface adjacent to an adjacent one of said microstructures.

2. The optical plate as claimed in claim 1, wherein each of said microstructures has a width (P) defined by a distance between two adjacent intersections, each of said microstructures having a maximum height (H) defined between one of the first and second convex portions and the imaginary plane, the maximum height (H) is in a range between 10 μm to 25 μm, and the ratio of H to P (H/P) of each of said microstructures is in a range between 0.1 to 0.5.

3. The optical plate as claimed in claim 2, wherein the maximum height (H) of each of said microstructure is in a range between 13 μm and 24 μm, and the ratio of H to P (H/P) of each of said microstructures is in a range between 0.2 and 0.4.

4. The optical plate as claimed in claim 1, wherein said concave portion of each of said microstructures has a minimum distance ($D_3$) defined between the lowest point of the concave portion and the imaginary plane, and the minimum distance ($D_3$) is in a range of higher than 16 μm and lower than 24 μm.

5. The optical plate as claimed in claim 4, wherein the minimum distance ($D_3$) of each of said microstructures is in a range of higher than 18 μm and lower than 22 μm.

6. The optical plate as claimed in claim 1, wherein, in each of said microstructures, said first convex portion has a first tip and said second convex portion has a second tip, and a distance (L) between said first and second tips of each of said microstructures is in a range of larger than 1.0 μm and lower than 40 μm.

7. The optical plate as claimed in claim 6, wherein the distance (L) of each of said microstructures is in a range of larger than 3.0 μm and lower than 35 μm.

8. The optical plate as claimed in claim 1, wherein said substrate further includes a supporting layer and a conforming layer formed on said supporting layer, said microstructures being formed on said conforming layer opposite to said supporting layer.

9. The optical plate as claimed in claim 8, wherein said conforming layer has a thickness in a range from 50 μm to 200 μm, and said supporting layer has a thickness in a range from 0.45 mm to 5 mm.

10. The optical plate as claimed in claim 8, wherein said substrate has a thickness in a range from 0.51 mm to 5.225 mm.

11. The optical plate as claimed in claim 8, wherein said conforming layer is made of a first resin material and said supporting layer is made of a second resin material.

12. The optical plate as claimed in claim 11, wherein said first resin material having a first molecular weight, said second resin material having a second molecular weight and said first molecular weight is lower than said second molecular weight.

13. A method for manufacturing the optical plate, comprising:
    providing a first resin material and a second resin material;
    conducting a co-extrusion step to co-extrude said first resin material and said second resin material to form a two-layered structure; and
    conducting a microstructure forming step to form said first resin material into a conforming layer and microstructures, and to form said second resin material into a supporting layer on which said conforming layer and microstructures are disposed.

14. The optical plate manufacturing method as claimed in claim 13, wherein said first resin material having a first molecular weight, said second resin material having a second molecular weight and said the first molecular weight is lower than said second molecular weight.

15. The optical plate manufacturing method as claimed in claim 13, wherein said microstructures are formed by a transfer roller.

16. The optical plate manufacturing method as claimed in claim 15, wherein said transfer roller has a transfer structure on a roller surface.

17. The optical plate manufacturing method as claimed in claim 16, wherein said transfer structure has a pattern complementary to that of the microstructures.

18. An optical plate, comprising:
- a substrate having a light emitting surface, a rear surface opposite to said light emitting surface, and a plurality of microstructures that cooperatively define said light emitting surface and each of which parallelly extends in a light traveling direction,
- wherein each of said microstructures includes first and second convex portions and a concave portion disposed between and interconnecting said first and second convex portions, two adjacent ones of said microstructures being connected, intersections between said microstructures cooperatively define an imaginary plane (S), a lowest point of said concave portion being disposed at one side of the imaginary plane opposite to said rear surface,
- wherein said concave portion of each of said microstructures has a minimum distance ($D_3$) defined between the lowest point of the concave portion and the imaginary plane, and the minimum distance ($D_3$) is in a range of higher than 16 μm and lower than 24 μm,
- wherein each of said first and second convex portions of each of said microstructures has at least one arc surface.

* * * * *